(12) United States Patent
Gilbert

(10) Patent No.: US 7,472,128 B2
(45) Date of Patent: Dec. 30, 2008

(54) INSERTING AN AID INTO AN ANSWER TO A REQUEST FOR A VIRTUAL OFFICE

(75) Inventor: Arnaud Gilbert, Perros Guiree (FR)

(73) Assignee: France Telecom, Paris (FR)

( * ) Notice: Subject to any disclaimer, the term of this patent is extended or adjusted under 35 U.S.C. 154(b) by 400 days.

(21) Appl. No.: 10/942,117

(22) Filed: Sep. 16, 2004

(65) Prior Publication Data
US 2005/0131934 A1 Jun. 16, 2005

(30) Foreign Application Priority Data
Sep. 18, 2003 (FR) ................................. 03 10998

(51) Int. Cl.
G06F 7/00 (2006.01)
G06F 17/00 (2006.01)
(52) U.S. Cl. .................................. 707/100; 707/104.1
(58) Field of Classification Search ................ 709/203; 707/100, 3, 5, 101, 104.1; 706/50
See application file for complete search history.

(56) References Cited

U.S. PATENT DOCUMENTS

| | | | |
|---|---|---|---|
| 2001/0049688 A1* | 12/2001 | Fratkina et al. | 707/104.1 |
| 2002/0052934 A1* | 5/2002 | Doherty | 709/219 |
| 2002/0059180 A1* | 5/2002 | Aoki et al. | 707/1 |
| 2002/0065710 A1* | 5/2002 | Saito | 705/10 |
| 2002/0188666 A1* | 12/2002 | Lemon et al. | 709/203 |
| 2002/0194262 A1* | 12/2002 | Jorgenson | 709/203 |
| 2003/0122859 A1* | 7/2003 | Aggarwal et al. | 345/708 |

FOREIGN PATENT DOCUMENTS

FR 2 809 255 5/2000

OTHER PUBLICATIONS

Gourley, D., and Totty, B. HTTP: The Definitive Guide [online]. O'Reilly & Associates, Inc., 2002 [retrieved on Dec. 13, 2006]. Retrieved from the Internet:<URL: http://proquest.safaribooksonline.com/1565925092> Chapter 11.4.*

(Continued)

*Primary Examiner*—Mohammad Ali
*Assistant Examiner*—Jason L Alvesteffer
(74) *Attorney, Agent, or Firm*—Lowe Hauptman Ham & Berner LLP

(57) ABSTRACT

An aid server (AS) comprises a processing module (PM) which stores a user identifier (UID) and an identifier (SID) of a stage of an application of the virtual office type, said identifiers being retrieved from a request sent by the terminal and designating an action need by the user. The request (REQt) is sent to a respective application implemented in at least one server ($VOS_i$) which executes the needed action and develops an answer sent to the aid server. A suggestion module (AM) analyzes lists of previously needed user actions to suggest a list of actions which are associated with stage identifiers. A graphics module (GM) incorporates an aid including the suggested actions list into the answer (ANSt) which is sent to the user terminal in order that the user shall select another action from the list of suggested actions.

4 Claims, 2 Drawing Sheets

OTHER PUBLICATIONS

Figure 1:
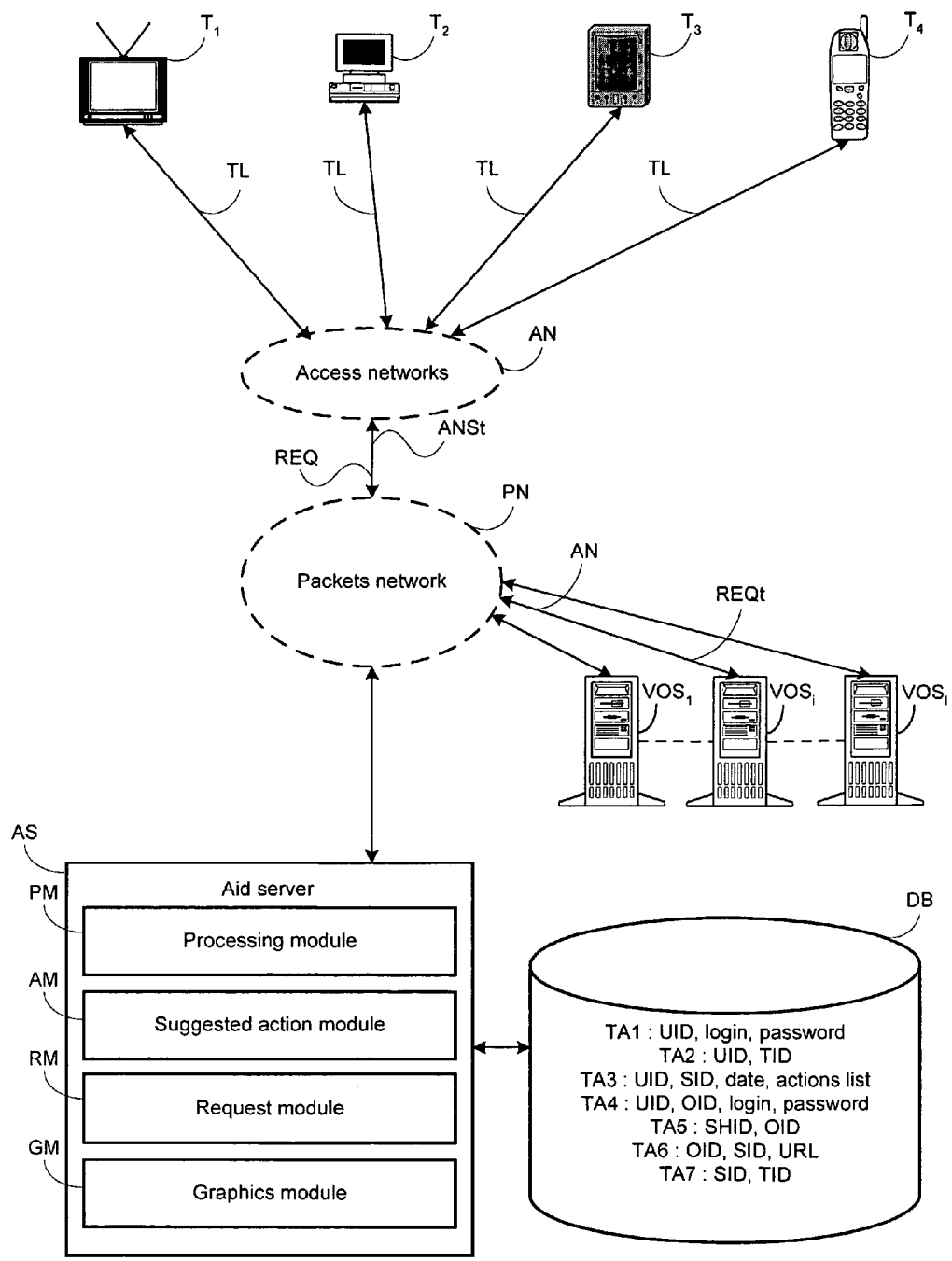

Liu, C. DNS & BIND Cookbook [online]. O'Reilly & Associates, Inc., 2003 [retrieved on Dec. 15, 2006]. Retrieved from the Internet:<URL: http://proquest.safaribooksonline.com/0596004109> Chapter 2.8.*

Shared Web- A Shared Virtual Environment Over World Wide Web; Jiung-Yao Huang, et al., Multimedia and Virtual Reality Lab; Institute of Computer Science . . . , 1997.

* cited by examiner

INSERTING AN AID INTO AN ANSWER TO A REQUEST FOR A VIRTUAL OFFICE

RELATED APPLICATIONS

The present application is based on, and claims priority from, France Application Number 03 10998, filed Sep. 18, 2003, the disclosure of which is hereby incorporated by reference herein in its entirety.

SPECIFICATION

The present invention relates to a procedure inserting a user's video aid and/or an audio aid and/or a text aid into an answer to a request sent by a user terminal through a telecommunications network.

Presently virtual office applications are being suggested to users by means of the internet. A virtual office application is a complex operational space consolidating in particular office applications within a single application. Said applications illustratively are an electronic data book, a letter box, an address book, a collaborative tool etc.

By means of virtual office servers connected to the telecommunication network, providers offer virtual office applications that in general are specific to the user's profession.

A user meets with serious difficulties in grasping all the functions a virtual office does offer. The high cost of being educated in using a virtual office application frequently is beyond user anticipation.

Typically text aids are made available to the user of a virtual office application. These text aids describe the operation and the potentials of the virtual office application.

Some virtual office application providers offer more interactive aids such as question and answer aids, telephone or digital assistance. The question and answer aid offers to the user to transmit a question through a form to the provider in order that latter or a specialist answers the user. Said aids and assistance are quite costly because entailing actions by humans on the part of skilled personnel.

Internet digital assistance inserts a virtual assistant that frequently is represented by a virtual person or gnome in the HTML hypertext pages (Hypertext Transfer Markup Language). the virtual person suggests an audio or text aid relating to the page contents to the user. Also, inserting a digital assistant relates more specifically to the hardware and software used by the provider servers.

The objective of the present invention is to automatically insert—into an application server answer to a request sent by a user terminal—an aid which matches recent user requests regardless of user software and hardware.

To attain said objective, a procedure for inserting a user aid into answers from an application which is implemented in a server means to consecutive requests sent by a user terminal through a telecommunications network is characterized in that by comprising—in an aid means connected to the user terminal—the following phases of an application stage which recurs after receipt of request:

storing a user identifier and a stage identifier which are retrieved from the request designating an action needed by the user and to be executed by an appropriate application in the server means, analyzing action lists previously requested by user for the purpose of suggesting a list of actions that relate respectively to stage identifiers and storing said action list in relation to user identifier, sending the request to the respective application which executes the required action pertaining to the stage identifier and which develops an answer sent to the aid means, incorporating into the answer an aid including the list of suggested actions, and sending the answer incorporating the aid to the user terminal in order that user shall select another action from the list of suggested actions.

By analyzing the user's previously requested action texts, the list of suggested actions included in the aid sent to the user terminal is matched to the user without depending on the server means implementing one or more applications.

Moreover the invention also relates to an aid means, for instance an aid server, to implement the aid insertion of the present invention. Said aid means comprises:

a means storing a user identifier and an application stage identifier which are retrieved from a user terminal sent request and designating a user requested action that shall be executed by a particular application in the server means, said request being sent to the particular application executing the requested action associated with the stage identifier and producing an answer sent to the aid means, a means analyzing action lists previously requested by the user in order to suggest a list of actions which are respectively associated with stage identifiers and to store said list of actions in relation to the user identifier, and a means incorporating an aid comprising the list of suggested actions into the answer which is sent to the user terminal in order that the user shall select another action from the suggested actions list.

Figure 2:
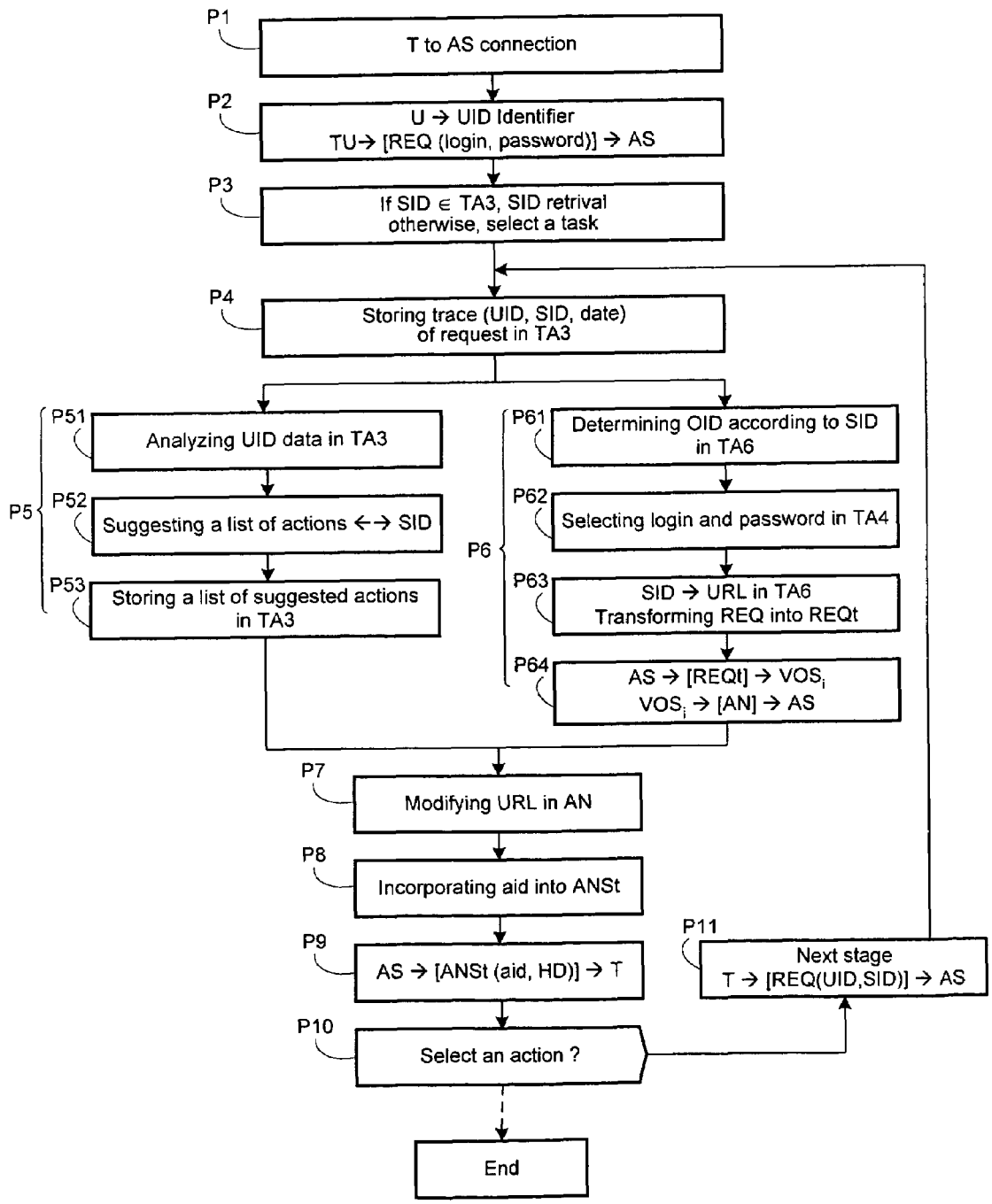

Other features and advantages of the present invention are elucidated in illustrative and non-limiting manner in the following discussion of several preferred embodiment modes of this invention, in relation to the appended, corresponding drawings:

FIG. 1 is a schematic block diagram of an aid system implementing the procedure which automatically inserts an aid into an answer to a request, in a preferred design of the present invention, and FIG. 2 is a flow chart of the insertion procedure of the preferred design of the present invention, showing the main phases of an application stage following a user request.

The aid system implementing the aid insertion procedure of the preferred design of the present invention is based on client-server type architecture. As shown in FIG. 1, said aid system mainly comprises several interactive terminals T, at least one aid server AS, one database DB, one virtual office servers $VOS_1$ through $VOS_J$.

A user accesses an aid service and more generally a set of applications by means of an aid or an assistant by connecting directly to the aid server AS using an interactive user terminal T. In the embodiment mode shown in FIG. 1, a user terminal T illustratively is an intelligent TV receiver. The TV receiver $T_1$ cooperates by means of an infrared link with a remote control having a display and an alphanumeric keyboard also acting as a mouse. In a variant, the remote control is fitted with a more extensive, wireless keyboard which is connected by short-range radio to the TV set.

Other household terminals, whether portable or otherwise, may be considered, for instance microcomputers, telephones, video game consoles etc. The terminal T is serviced by a telecommunications link TL and an access network AN such as a telephone line and the switched telephone network in order to be connected to a high rate, internet type packet transmission network PN to which the aid server AS is connected.

In another illustrative embodiment, the user terminal $T_2$ is a personal computer which is directly connected by modem to the TL link. In other embodiment modes, the user terminal $T_3$ comprises a user's personal electronic telecommunications device or the like that may be a personal digital assistant PDA or else it comprises an intelligent radio set instead of the TV receiver $T_1$, where the two kinds of receiver also may coexist.

The telecommunications link TL may be an xDSL (Digital Subscriber Line) line or a Integrated Digital Services Network (IDSN) which is connected to the corresponding access network.

In yet another embodiment mode, the terminal $T_4$ is a mobile cell radio communications terminal, the telecommunications link TL is a radio communications channel, and the access network AN is the stationary network of the Global System for Mobile Communications (GSM) preferably with a General Packet Radio Service (GPRS) or of the Universal Mobile Telecommunications System (UMTS) type.

The user terminals and the access networks are not restricted to the above embodiment modes illustrated in FIG. 1 and may be in the form of other known terminals and access networks. In the preferred embodiment modes, all terminals are equipped with a navigator web.

Within the scope of the present invention a task is a user-selected objective that is reached by a sequence of application stages each composed of a unique action selected from a suggested-actions list that is associated with said stage. The stages follow each other as desired by the user according to a dynamic tree geometry of action lists each depending on the action chosen by the user in the preceding stage. An action included in one suggested actions list in the previous stage may also be included in the suggestion actions list of the next stage. A task's number of stages is a function of the user's objective, and the stage of one task may belong to diverse applications.

In general an action is denoted by a natural language sentence, and a stage is denoted by a title suggesting the action that was selected at the end of the previous stage.

Frequently an action is represented by a hypertext link, or more generally a hypermedia link, to access the ensuing stage.

Illustratively a user does select the task "Place a phone call". This task begins with a first stage that is associated with the list of actions such as:

"Open Address Book"

"Dial a Phone Number"

"Look up Messages".

The user selects "Open Address Book". This action triggers a second stage "My Book" which is associated with a list of actions suggested to the user:

"Add New Contact"

"Delete a Contact"

"Call Someone"

"Write to Someone".

As third stage follows the second stage to suggest another action list that may include one of the already suggested actions in the preceding first and second stages.

To implement the present invention, the Aid Server AS more particularly comprises a processing module PM, a suggested-action module AM, a request module RM and a graphics module GM.

Each of the virtual office servers $VOS_1$ through $VOS_J$ contains at least one virtual office application which is accessible through the packet network PN to the aid server AS and which includes at least one action.

The database DB in particular comprises seven tables TA1 through TA7.

Table TA1 relates User identifiers UID to personal user information. The personal user data are such as login, password, and last name and/or first name and user profile. The login and the password were previously assigned to the user when subscribing to the aid service and identify the user to the aid server AS so that user may access the aid service provided by the aid server.

Table TA2 relates at least one user identifier UID to at least one task identifier TID. A user may select several tasks simultaneously, in which event Table TA2 relates the UID identifier to several task identifiers TID.

Table TA3 relates at least one user identifier UID to at least one stage identifier SID, one URL (Uniform Resource Locator) address and one date. A "List of Actions" field also is available in Table TA3 to store in it the actions suggested to the user at each stage. The natural language wording of each action is associated with the SID identifier of a following stage that may be selected by the user and is present in a request to the aid server AS in order that said ensuing stage shall be executed. Table TA3 contributes to tracing the user along the sequential actions he/she did select. Each request REQ sent by the terminal T to the user relates to an entry in Table TA3 called "trace", in particular including the user identifier UID, the stage identifier SID corresponding to the action just having been selected by the user, the current date of receiving the request and an action list corresponding to the stage identifier SID and to be presented to the user.

Table TA4 relates at least one user identifier UID to connection parameters covering at least one and in general several virtual office applications the corresponding user is authorized to access because of his/her subscription to the aid service. The connection parameters concerning a virtual office application that are user specific are at least one virtual office application identifier OID and one login and one password all concerning the corresponding virtual office application. Illustratively pairs consisting of user login and password relate respectively to virtual office application identifiers OID to which the user is subscribing. Such data were previously provided by a service provider linked to the aid server AS when the user subscribed to the aid service. Through the aid server AS, a user may access in transparent manner several virtual office servers and hence several virtual office applications which are distributed in the virtual office servers $VOS_1$ through $VOS_J$ in order to avail himself/herself of the specific functions of each virtual office application.

Table TA5 relates a virtual office identifier OID to a style sheet identifier SHID which in particular defines presentation parameters of an action list.

Table TA6 relates each OID identification pair of a virtual office identifier and of a SID of a stage of this application to a URL (Uniform Resource Locator) address of said stage along a path in the application and as a function of an address of the virtual office server implementing said application. Table TA6 lists all extant stages in the virtual office applications. This table is filled beforehand either manually or be a resources indexing motor.

The information constituted by UID, SID, date and suggested actions list that are suggested in an entry of the Table TA3 and the address URL relating to the stage identifier SID in Table T6A constitute a request trace for the user denoted by the UID identifier.

Table T7A relates each stage identifier SID to a task identifier TID and to an order of task stages. This order defines the sequencing of the stages in the task.

In a first embodiment of the present invention, the suggested action module AM is located in a suggestion server connected to the packet network PN. The aid server AS then accesses the suggestion server through the packet network PN.

In a second embodiment of the present invention, each virtual office server $VOS_i$ comprises modules implementing the functions of the aid server AS and of the database DB. Then a user terminal T directly accesses a virtual office server $VOS_i$ through a telecommunications network including the associated access network AN and the packet network PN.

The automatic insertion procedure of an aid into an answer to a request mainly comprises the phases P1 through P11 shown in FIG. 2 of the preferred embodiment of the present invention.

The aid insertion procedure begins by opening a session following connection of the user terminal T to the aid server AS to the phase P1.

At the beginning the phase P2 relating to identifying the terminal user, the processing module PM sends a message to terminal T asking the user to pick up his/her login and password which are transmitted in an initial request to the aid server AS. Next the processing modules checks that there is an entry in Table TA1 of the login and password contained in the request from the user terminal. Once an entry has been found in Table TA1, the user will have been identified and the user identifier UID of said identified user then shall be known. If otherwise, the user remains unidentified and therefore shall be barred from accessing the aid service.

In phase P3 and if the user already did use the aid service, and therefore if the Table TA3 contains at least one entry corresponding to the UID identifier and to an action that was selected during a previous task stage, then the processing module PM will consult the memory table TA3 in order to retrieve the stage identifier SID of the user's last selected stage. If no entry at all corresponds to the UID user identifier in Table TA3, the processing module PM selects from Table TA7 a predetermined list of predetermined task identifiers TID which is transmitted to the user terminal T so that the user can select a task.

In an embodiment variation, LIFO (Last In First Out) stacks or the like are used to increase data access speed. A stack contains data regarding the last stage carried out by a user by matching a stage identifier SID to a user identifier UID. In that case Phase P3 is carried out using the stack, not the memory Table TA3.

The processing module PM stores into Table TA3 at phase P4 a trace which is composed of the user identifier UID, the stage identifier SID of the user's last stage and the current date, and it retrieves from Table TA6 the URL address corresponding to the SID identifier of the last stage associated with the last selected action.

As is made clear further below, the phase P4 concerns in recurrent manner the beginning of any application stage composed of phases P4 through P10 subsequent to a first stage at the beginning of the current session and retrieves UID and SID identifiers from a request REQ transmitted by the user terminal following a user-selected action.

Following phase P4, double processing is carried out in parallel regarding phases P5 and P6 comprising respectively sub-phases P51 through P53 and P61 through P64.

As regards the first processing phase P5, the suggested action module AM analyzes the traces of the preceding requests in relation the user identifier UID in Table TA3 at sub-phase P51. The suggested action module AM is fitted with the table TA6 storing all possible actions in a virtual office application relating to a virtual office application identifier OID, a stage identifier SID and a URL address and also, illustratively, statistical data concerning this action. This analysis in particular takes into account the SID identifier of the last user-selected stage, said identifier being stored at the phase P4. The suggested action module AM in the course of this analysis compares a predetermined maximum number of recent stages borrowed by user and analyzes the suggested actions that were especially selected by this user during said recent stages, for example, to determine suggested actions depending on the actual user needs. The user's needs are determined as a function of the user profile which is entered in particular into the Table TA2.

Thanks to this analysis, with the suggested action module AM having pre-stored a user profile when this user subscribed, said module AM now suggests a list of actions matched to the user at the sub-phase P52. Illustratively, when the user no longer resorts to the aid service but only to the virtual office application, the suggested action module AM will change the actions it suggests. For instance the suggested action module AM relies on statistical analysis to predict the action suggested during the current stage.

In the sub-phase P53, the suggested action module AM loads into Table TA3 the list of actions suggested by the suggested action module AM in association with the pair constituted by the UID user identifier and the stage identifier SID stored in phase P4. The wording of each action is linked to a hyperlink, that is to a URL address including the address of the aid server AS and the SID identifier of a particular potential next stage.

In the sub-phase P61 of the second processing procedure P6, the processing module PM determines within Table TA6 the virtual office application identifier OID corresponding to the SID identifier of the last user-selected stage, said identifier being stored in phase P4 and included in the request REQ that was received.

In sub-phase P62, the processing module selects from the Table TA4 the specific login and user password regarding the respective virtual office application corresponding to the OID identifier determined in the preceding sub-phase P61 and associated to the user identifier UID. The user identification requested by the aid server AS at one of the virtual office servers $VOS_i$ is transparent to the user.

The request module RM transforms the request REQ into a transformed request REQt in the sub-phase P63 before the request REQt is transmitted. This transformation is in two parts. The first part consists in incorporating the connection parameters consisting of the login and the password that were selected in the preceding sub-phase P62 into the request REQ in order that said preceding sub-phase P62 identify the user as a function of the connection parameters in the virtual office server $VOS_i$ corresponding to the OID identifier determined in the sub-phase P61.

As regards the second part of the sub-phase P63, the request module RM selects the URL address of the stage—of which the identifier SID is included in the user request REQ—into the Table TA6 in order to also introduce this URL address—in the of recipient address including the address of the application relating to the stage—into the request.

In the sub-phase P64, the aid server (AS) sends a transformed user request REQt which includes connection parameters and the stage address to the application in the virtual office server $VOS_I$ corresponding to the addressee's address. The VOSi in this manner will carry out the action denoted by the stage identifier SID included in the REQt request.

In an embodiment variation of the present invention, a URL address field is added to the Table TA4 in order to enter a URL user identification address which is fixed into the virtual office server denoted by the given identifier OID. The request module RM sends to the designated virtual office a request for identification that includes user login and password relating to the URL user identification address in order to identify this user. The aid server AS receives an answer to the request for identification and, if identification is positive, sends an REQt request to the virtual office server toward the URL addressee address of the stage designated by the SID identification in the REQ request.

The request module RM receives the answer ANS from the virtual office relating to the REQt request and transforms the answer ANS into a transformed answer ANSt. This transformation is resolved into two parts P7 and P8.

Phase 7 modifies all uniform resource locator URL addresses included in the answer ANS of the virtual office server $VOS_i$ in order that these URL addresses be replaced by predetermined addresses inclusive the address of the aid server AS and in this manner no longer relate to the virtual office server VOSi or to any other $VOS_1$ through $VOS_f$ server but to the aid server AS. Such address replacement is known to the expert and is used in proxies.

As regards the preferred embodiment of the present invention, the virtual office is displayed in the user terminal in the form of a first window and the aid is displayed in the form of a second window.

In a simple embodiment variation, the request module RM does not modify the URL addresses of the ANS answer.

As regards the phase P8, the graphics module GM incorporates an aid, inclusive the list of suggested actions that were suggested in phase P53, into the answer ANS of which the addresses of the uniform resource locator URL were modified to produce the transformed answer ANSt. Each action incorporated into the answer ANSt sent to the user terminal T is in the form of a wording and of an address of the uniform resource locator URL which comprises the address of aid server AS and the identifier SID of a particular stage. The aid is displayed in the second window in the manner of the preferred embodiment of the present invention. When the second window is non-existent, the graphics module GM inserts—into the answer from the virtual office server—a code designating the second window to generate same in the terminal T while including the list of suggested actions. Where the second window does exist, its content shall only be updated.

In order to present the second windows contents inclusive the list of suggested actions according to the same schematic as is the corresponding virtual office application, the graphics module GM selects, from the Table TA5, a sheet identifier SHID of the style associated with the virtual office application identifier OID present in the request REQ.

In one embodiment variation of the present invention, the style sheet furthermore depends of the identifier of the last user-selected stage. In that case a stage identifier field is provided in the Table TA5. The aid display will be different at each stage.

In the preferred embodiment of the present invention, the technology which is employed to implement the list of actions illustratively shall the Extensible Markup XML Language which is illustratively paired with XSL (Extensible Stylesheet Language) sheets. Where the contents of the second window must be loaded through the user terminal T, the graphics module GM sets up the aid to be sent to the terminal together with a style sheet relating to the style sheet identifier SHID.

In phase P9 the aid server AS sends the transformed answer ANSt to the user terminal T.

Next, in phase P10, if the user selects an active zone that frames the wording of one of the suggested actions of the list included in the aid contained in the transformed answer ANSt and displayed in the second window on the screen of the user terminal T, then another request REQ including the user identifier UID and the application stage identifier SID associated with the suggested action will be sent to the aid server AS in phase P11. The procedure is repeated in the aid server AS beginning with the storage phase P4 by carrying out the stage application designated by the stage identifier SID retrieved from the received request REQ.

Again, if user selects an active zone of the first window, another request REQ including user identifier UID and application stage identifier SID are transmitted to the aid server AS.

If implementation of the preceding stages is satisfactory to user, same may terminate the session at any time between the phases P4 through P10 by commanding disconnecting the terminal T from the aid server AS.

The above described preferred embodiment of the present invention relates to an aid or tool for a virtual office application. However the invention also relates to inserting an aid for applications other than a virtual office application, for instance banking operations or downloading operations.

The invention described herein relates to a procedure and an aid means such as the aid server AS to insert a user aid into answers ANS—of an application implemented in $VOS_1$-$VOS_f$ server means—to consecutive requests REQ sent by a user terminal. In a preferred implementation, the procedure's stages are determined by the instructions from an aid program incorporated into an aid server and the procedure of the invention is carried out when this program is loaded into a computer of which the operation is controlled by running the said program.

Consequently the present invention also applies to a computer program, in particular a computer program on or in a data medium designed to carry out the present invention. This program may use any programming language and be in the form of a source code, an object code, or a code intermediary between source and object codes, or an intermediate code between source and object codes such that it is in partly compiled form or in any other desirable form to carry out a procedure of the invention.

The data medium may be any entity or device able to store the said program. Illustratively the medium may comprise a storage means such as ROM, for instance a CD ROM or microelectronic circuit ROM, or a magnetic storage means such as a floppy disk or a hard disk.

The invention claimed is:

1. A method of inserting a user aid or tool into answers of an application performed in a server arrangement in response to consecutive requests sent by a user terminal through a telecommunications network, the method being performed by an aid arrangement connected to the user terminal and comprising the following steps of a recurrent application stage, the steps being performed in response to receiving a request:

storing a user identifier and a stage identifier that have been retrieved from the received request designating an action needed by the user to be carried out by a respective application in said server arrangement, analyzing lists of actions previously needed by the user to (a) derive a list of suggested actions which are respectively associated with stage identifiers, and (b) store said list in relation to the user identifier, transmitting the received request to the respective application which carried out the needed action associated with the stage identifier and which develops an answer transmitted to the aid arrangement, incorporating an aid including the list of suggested actions into said answer, transmitting the answer including the aid to the user terminal for enabling said user to select another action from the list of suggested actions, and before requesting transmission to at least one application in the aid arrangement, selecting connection parameters which are specific to the respective application and which were previously stored in the aid arrangement and incorporating the connection parameters in the request sent to the respective application for enabling that said application to identify the terminal user as a function of the connection parameters.

2. A method of claim 1 further including causing said application to identify the terminal user as a function of the connection parameters in response to the connection parameters in the request being sent to the respective application.

3. An aid arrangement for inserting a user aid into answers of an application performed in a server arrangement in response to consecutive requests sent by a user terminal through a telecommunications network, comprising a processor arrangement for:

(a) storing a user identifier and an application stage identifier adapted to be retrieved from a request sent by the user terminal and received by the aid arrangement, the request designating an action needed by the user to be executed by a respective application in the server arrangement, the request being adapted to be sent to the respective application for executing the needed action associated with the stage identifier and for developing an answer adapted to be transmitted to the aid arrangement, (b) analyzing previously needed lists of user actions for (i) suggesting a list of actions which are associated respectively with stage identifiers and (ii) storing said list in relation to the user identifier, (c) incorporating an aid adapted to include the list of suggested actions in the answer that is adapted to be sent to the user terminal for enabling the user to select another action from the list of suggested actions, and wherein the server arrangement comprises plural servers wherein the aid arrangement is adapted to distribute plural applications each including at least one action, and the processor arrangement is arranged for listing all the extant stages in the applications to match each stage identifier in an application to an address of said stage in the application as a function of an address of the server which performs said application.

4. An aid arrangement as claimed in claim 3 wherein the server arrangement comprises plural servers, wherein there are distributed several applications each including at least one action, the aid arrangement processor arrangement being arranged for listing all the extant stages in the applications to match each stage identifier in an application to an address of said stage in the application as a function of an address of the server for performing said application.

* * * * *